United States Patent
Phillips et al.

(10) Patent No.: US 9,530,574 B1
(45) Date of Patent: Dec. 27, 2016

(54) SUPER DIELECTRIC MATERIALS

(71) Applicant: The United States of America, as represented by the Secretary of the Navy, Washington, DC (US)

(72) Inventors: Jonathan Phillips, Pacific Grove, CA (US); Samuel Salvadore Fromille, Kapolei, HI (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 204 days.

(21) Appl. No.: 14/624,321

(22) Filed: Feb. 17, 2015

Related U.S. Application Data (60) Provisional application No. 62/075,309, filed on Nov. 5, 2014.

(51) Int. Cl.
  *H01G 11/60* (2013.01)
  *H01B 3/10* (2006.01)
  *H01G 11/62* (2013.01)

(52) U.S. Cl.
  CPC ............... *H01G 11/60* (2013.01); *H01B 3/10* (2013.01); *H01G 11/62* (2013.01)

(58) Field of Classification Search
  CPC ............ H01G 11/60; H01G 11/62; H01B 3/10
  USPC ............................................. 361/502
  See application file for complete search history.

(56) References Cited

U.S. PATENT DOCUMENTS

| | | | |
|---|---|---|---|
| 2011/0149473 A1* | 6/2011 | Eilertsen | H01G 11/24 361/502 |
| 2014/0268490 A1* | 9/2014 | Tsai | H01G 4/01 361/305 |

* cited by examiner

*Primary Examiner* — Eric Thomas
*Assistant Examiner* — Michael P McFadden
(74) *Attorney, Agent, or Firm* — Naval Postgraduate School; James B. Potts; Lisa A. Norris (57) ABSTRACT

A class of materials is provided that has dielectric constants greater than $10^5$. The super dielectric materials (SDM) can be generated readily from common, inexpensive materials. Various embodiments include a porous, electrically insulating material, such as high surface area powders of silica or titania, mixed with a liquid containing a high concentration of ionic species. In some embodiments, high surface area alumina powders, loaded to the incipient wetness point with a solution of boric acid dissolved in water, have dielectric constants greater than $4*10^8$.

20 Claims, 11 Drawing Sheets

SUPER DIELECTRIC MATERIALS

CROSS-REFERENCE TO RELATED APPLICATIONS

This application claims priority to and the benefit of U.S. provisional application Ser. No. 62/075,309, filed Nov. 5, 2014, which is hereby incorporated in its entirety by reference.

BACKGROUND OF THE INVENTION

1. Field of the Invention

The present invention is directed to dielectric materials. In particular the present invention is directed dielectric materials having high dielectric constants.

2. Description of the Related Art

There are several distinct capacitor technologies, such as super capacitors and traditional electrostatic, also known as 'dielectric', capacitors. Super capacitors increase capacitance by increasing the surface area of the electrically conductive electrode. Most of the volume of a super capacitor is the high surface area electrode, which is basically in powder form. Increasing the super capacitor 'depth' while keeping constant the shape/surface area of the attaching ends, increases the amount of electrode material area and increases the capacitance. Consistent with this paradigm is the recent interest in employing graphene in super capacitors, as graphene is very good for that purpose. Indeed, graphene has very high electrical conductivity and the measured surface of some graphene forms are near the theoretical limit (~2700 $m^2$/gm). Given that the electrode surface area of graphene in super capacitors is near its theoretical limit, further dramatic energy density increases in these devices is unlikely.

In contrast to the improvements made with super capacitors, there has only been a marginal advance in the last few decades in finding materials with superior dielectric constants for the traditional electrostatic capacitor that is a capacitor built of a single dielectric material with a high dielectric constant sandwiched between two flat conductive electrodes. One clear functional contrast between super capacitors and electrostatic capacitors is the impact of 'depth' or 'thickness'. In an electrostatic capacitor, capacitance increases inversely to the distance between plates. Thus, given plates of a constant size, the thinner an electrostatic capacitor, the greater the capacitance. Therefore in order to improve the performance of this style of capacitor they either have to be made thinner and/or use materials with higher and higher dielectric constants.

BRIEF SUMMARY OF THE INVENTION

In accordance with one embodiment of the invention a dielectric material having a dielectric constant greater than $10^5$ includes: a porous material having a surface area greater than 1 $m^2$ of surface/gm of material; and a liquid containing ions, wherein the porous material is mixed with the liquid.

In accordance with another embodiment of the invention a capacitor includes: a first layer including a conductive material; a dielectric material located on the first layer, wherein the dielectric material has a dielectric constant greater than $10^5$ and includes; a porous material having a surface area greater than 1 $m^2$ of surface/gm of material; and a liquid containing ions, wherein the porous material is mixed with the liquid; and a second layer located on the dielectric material, wherein the second layer is made of a conductive material.

In accordance with a further embodiment of the invention a method for forming a dielectric material with a dielectric constant greater than $10^5$ includes: forming a paste by mixing a porous material having a surface area greater than 1 $m^2$ of surface/gm of material, with a liquid containing ions.

DETAILED DESCRIPTION OF THE INVENTION

For illustrative purposes, the principles of the present disclosure are described by referencing various exemplary embodiments. Although certain embodiments are specifically described herein, one of ordinary skill in the art will readily recognize that the same principles are applicable to, and can be employed in other systems and methods.

Before explaining the disclosed embodiments of the present disclosure in detail, it is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in different order as may be appreciated by one skilled in the art; the method embodiments described are therefore not limited to the particular arrangement of steps disclosed herein.

It is be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

Super dielectric materials (SDM), as used herein, are materials with dielectric constants greater than $10^5$. An embodiment of the present invention is the creation of such SDM materials. Charged species (ions) in liquid drops are placed in the pores of solids. The ions in the liquid drops migrate to create dipoles in an applied electric field. The created dipoles are postulated to be equal in length to the drop diameter. This phenomenology can be manipulated to create a high dielectric material, i.e. the SDM. Thus SDMs can be created by adding solutions containing ions (e.g. dissolved salt solutions) to highly porous insulating materials.

Example 1

In one embodiment of the present invention, the measured dielectric constant of an SDM created from a high surface area alumina bathed in a solution of boric acid, is orders of magnitude higher (ca. $>10^8$) than any form of barium titinate. The high dielectric constants measured, provides for having a material that can be used to develop an electrostatic capacitor, a SDM capacitor 10 (FIG. 2), as an alternative to super capacitors for electrical energy storage/power delivery.

However, the electrolyte 'breaks down', resulting in conduction, just as in a superconductor, at a relatively low voltage. For the particular materials combination found herein the ultimate 'capacitive' voltage was about 0.8 Volts. Extrapolating the current results to a 'depth' typical of ceramic capacitors (5 micron), and using better electrolytes will yield a higher ultimate voltage (2.5 V) that will further yield an energy density of order 1000 J/cm³.

Figure 1:
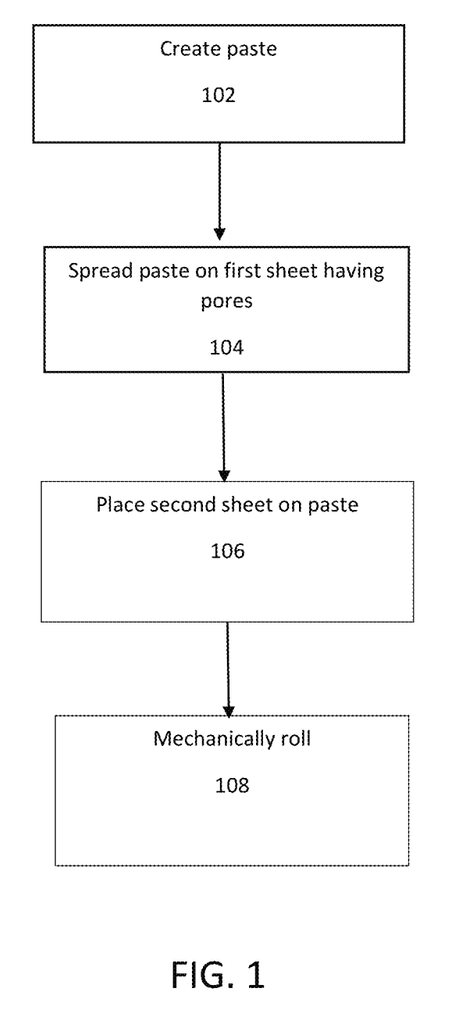
FIG. 1 shows a flow chart illustrating the method of forming a super dielectric material (SDM) and a SDM capacitor formed using SDM.
Figure 2:
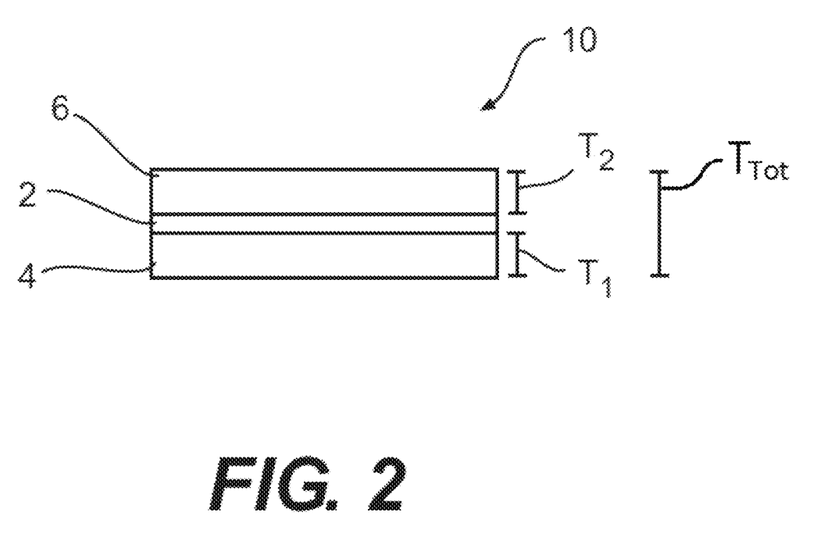
FIG. 2 is a diagram showing an SDM capacitor formed from an SDM.

The fabrication of an SDM, such as SDM 10, is now described herein, with reference to FIGS. 1 and 2. In step 102, a dielectric layer 2 is formed by making a paste. In the embodiment described herein, dielectric layer 2 is formed by making an aluminum/boric acid paste. Other materials may be used to form dielectric layer 2, such as any non-conductive, porous solid to which a 'polar' liquid with dissolved ions will mix powders of alumina, silica, titania, magnesia, and other metal oxides may be used for the solid dielectric material. Preferably the porous material is an electrical insulator, i.e. a material that allows little to electricity to pass through it. The liquid may be any polar liquid in which a salt is dissolved, a polar liquid in which a soluble acid is dissolved, or a polar liquid in which a base is dissolved, for example, salt (NaCl) water may be used for the liquid containing ions. As used herein, "salt" includes nitrates, nitrides, carbides, alkali halides, metal halides and other crystal structures that dissolve in water to create dissolved ions. Additionally, the liquid may comprise an organic solvent, containing an electrolyte selected from an acid, a base, and a neutral salt. Also, the liquid containing ions, may be a liquid such as those found in acid or base solutions, salt solutions, other electrolytic solutions or ionic liquids of any kind.

In order to form the paste of aluminum/boric acid, high surface area aluminum oxide powder (Alfa Aesar, γ-phase, 99.97%, 3 micron APS Powder, S.A. 80-120 m²/g, CAS 1344-28-1), boric acid powder (BDH, 99.5% $H_3BO_3$, CAS 10043-35-3), and distilled deionized water, i.e., constituents, are used. By "high surface area" it is meant that the surface area is preferably about or greater than 1 m²/gm. However, more preferably the surface area is greater than 10 m²/gm. These constituents were mixed by hand to obtain this ratio in all cases: 1 gm alumina/1 ml $H_2O$/0.1 gms boric acid powder. The mixed constituents created a spreadable paste with little to substantially no free water (incipient wetness). "Paste" as used herein refers to a thick, soft moist substance, having little to substantially no free water. A mixture of 1 ml of water and 0.1 gms boric acid is only weakly acidic with a theoretical pH of approximately 4.5.

As pore structure is a significant component of the embodiment, the surface area and pore structure were determined from BET nitrogen isotherms collected at 77K and analyzed using a Quantachrome NOVA 4200e. Two samples were independently measured and both yielded results within 5% for all parameters. Specifically a surface area of 39+/−1 m²/gm, a total pore volume of 0.45 cm³/gm and an average pore radius of 245+/−3 Å.

In step 104, the paste was spread evenly on a first layer 4 in order to form dielectric layer 2. In the embodiment described herein first layer 4 is a 2.5 cm diameter disc of GTA grade Grafoil (0.76 mm thick, >99.99% carbon). GTA grade Grafoil is a commercially available high purity carbon material that is available in sheets or rolls made by compressing naturally occurring graphite flakes. In step 106, a second layer 6 is placed on top of dielectric layer 2, which is the paste that has been spread on first layer 4. In this embodiment, second layer 6 is also made of Grafoil. It should be understood that both first layer 4 and second layer 6 can be made of electrically conductive material, such as metal conductors. In step 108, thin SDM capacitor 10 is then mechanically rolled to create a near constant thickness as determined by measurements made at multiple positions using a hand held micrometer. The 'effective thickness' of the dielectric used in all computations herein was based on subtracting the thickness of first layer 4, herein a first thickness $T_1$, and the thickness of second layer 6, herein a second thickness $T_2$, from the measured total thickness of SDM capacitor 10, herein total thickness $T_{TOT}$.

Once constructed one or more SDM capacitors 10 were placed in a plastic jig with bottom and top cylindrical aluminum electrodes having 5 cm diameters and 5 mm thicknesses. A 250 gm weight was placed on top in all cases. SDM capacitors 10 were then placed in simple circuits, such as that shown in FIG. 3 to obtain measurements of charge and discharge. Charging and discharging were performed through a nominal 20 kOhm resistor. The primary test platform was a National Instruments ELVIS II electronics prototyping board implemented with LabView 2011 software. An additional multimeter, Agilent U1252A, was used for independent parameter verification. Additionally the capacitance of several types of commercial capacitors were measured using the above described instruments and protocol, and in each case the measured value and the listed value were within 2%.

Figure 3:
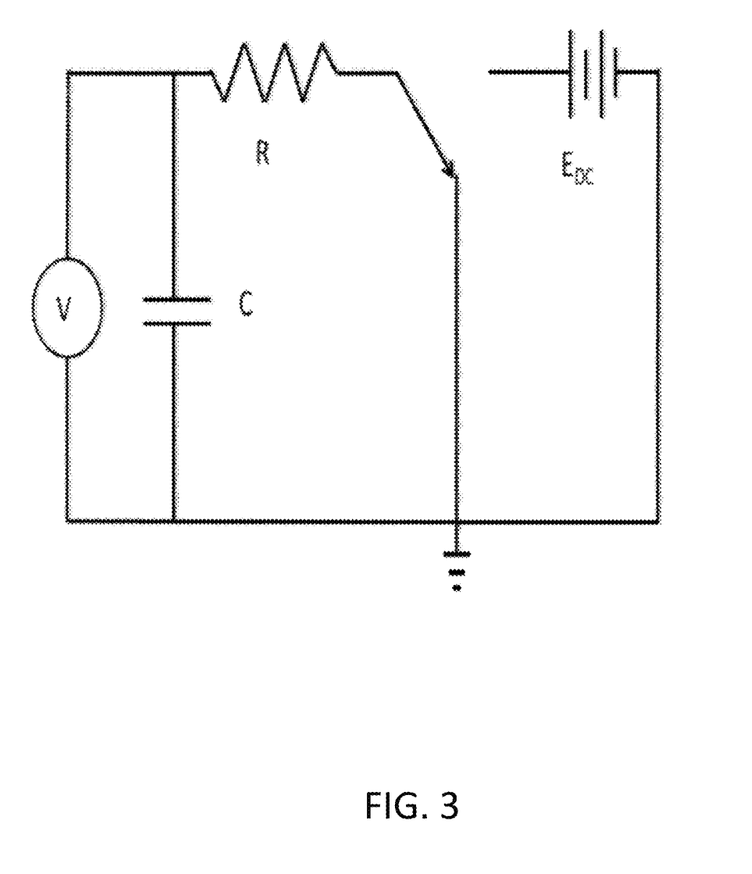
FIG. 3 is a diagram of the circuit used in testing an SDM capacitor.
Figure 4A:
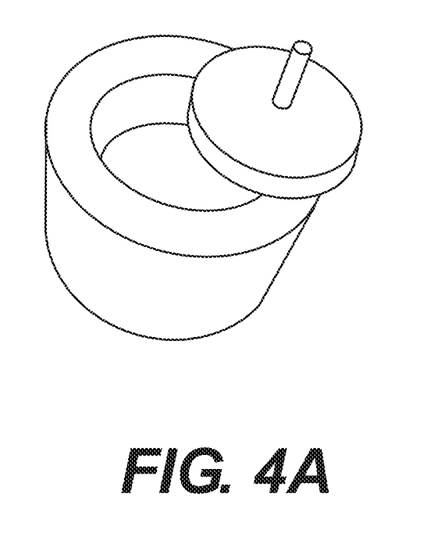
FIG. 4A shows an SDM capacitor placed in a hard plastic jig between two aluminum electrodes having 5 cm diameters.
Figure 4B:
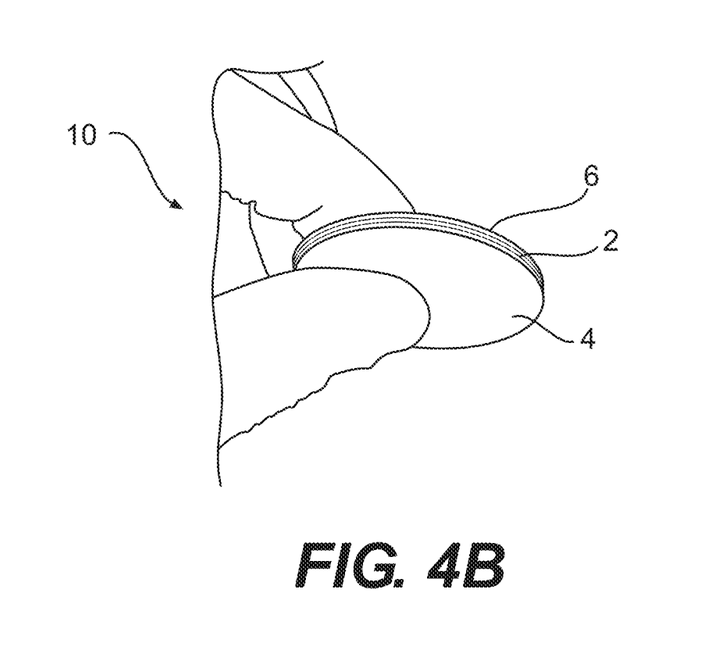
FIG. 4B shows a completed SDM capacitor

FIGS. 3, 4A and 4B illustrate measuring capacitive properties in accordance with one embodiment of an SDM, such as SDM 10 (FIG. 2). In one embodiment, the term A-SDM is used herein where A stands for alumina. In FIG. 3 with the switch 'down' the discharge voltage across the resistor is measured, and with the switch 'up' the charging is recorded. In FIG. 4A the capacitor is placed in a hard plastic jig between two aluminum electrodes having a 5 cm diameter. FIG. 4B shows a completed SDM capacitor 10 with the paste 2 of aluminum/water/boric acid squeezed between first layer 4 and second layer 6 made of Grafoil in accordance with an embodiment of the present invention.

Figure 5:
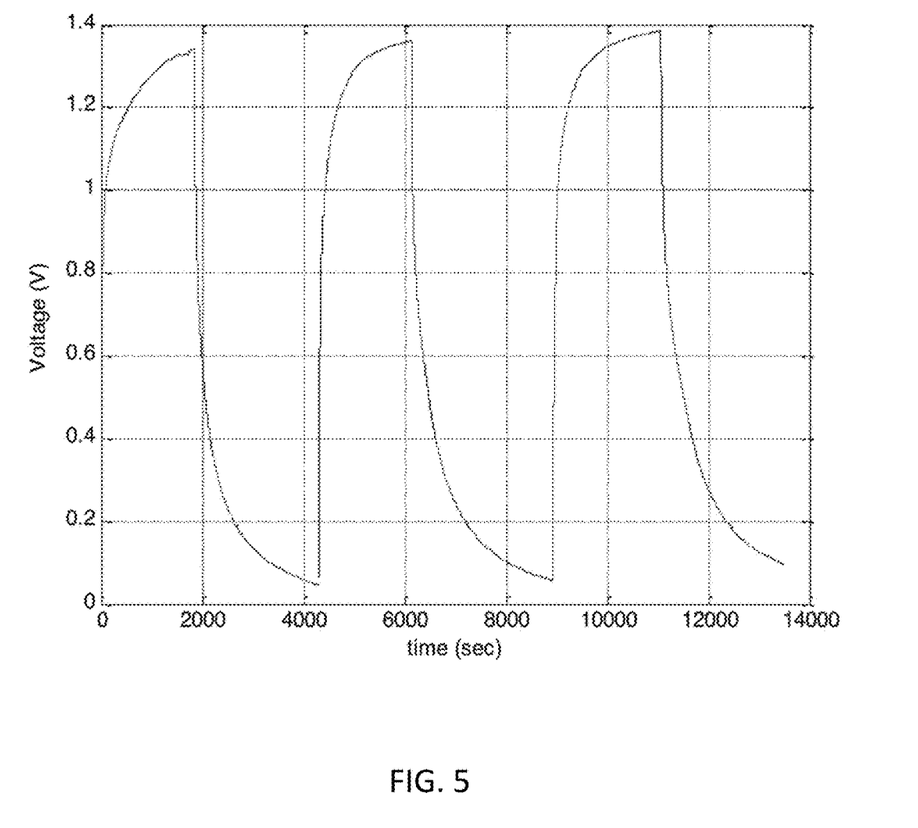
FIG. 5 shows capacitive cycling in accordance with an embodiment of the present invention.

Basic phenomenological data from studies of cyclic charging and discharging show that SDM capacitors 10 made with A-SDM 10 behave as near ideal capacitors over a limited, repeatable, voltage range. Typical multi-cycle data from one SDM capacitor 10, charged through a 20 kOhm resistor from a power supply operated at 4 V, then discharged through the same resistor, is shown in FIG. 5. Re-plotting similar data from several SDM capacitors 10 was done to test the proposition that these SDM capacitors 10 charge/discharge exponentially, as per standard electrostatic capacitors. The equation for this is shown below:

$$\ln(V/V_0) = t/RC \quad (1)$$

In equation (1) above, V is voltage, $V_0$ is initial voltage, t is time, R is resistance and C is capacitance. Moreover, the dielectric constant of A-SDM in SDM capacitor 10 can be obtained from the time constant and the standard equation:

$$C = \varepsilon_0 \varepsilon_R \frac{A}{d} \quad (2)$$

In the above equation C, is capacitance, $\varepsilon_0$ is the permittivity of free space and $\varepsilon_R$ is the dielectric constant. The area of the plate surface is A and the distance between plates occupied by dielectric is d. From the plot shown in FIG. 6 it is clear that in all cases below about 0.8 V (more precise data given in Table I) SDM capacitors 10 have constant time constants, hence constant capacitance. Using these measured time constants, the resistance value, and the physical parameters of SDM capacitors 10 the dielectric constants of A-SDM were computed, as shown in Table I. The A-SDM dielectric material in SDM capacitors 10 is a form of super dielectric material, where in each case the measured dielectric constants were greater than $4*10^8$.

TABLE 1

| Composition | Dielectric Thickness (d) | Initial Discharge Voltage ($V_0$) | Dielectric Constant ($E_R$) | Operating Voltage |
|---|---|---|---|---|
| 3 g alumina 0.3 g boric acid 3 mL H$_2$O | 1.47 mm | 2.20 V | 1.81E9 | 0.7 V |
| 4 g alumina 0.4 g boric acid 4 mL H$_2$O | 2.46 mm | 2.16 V | 5.78E8 | 0.8 V |
| 5 g alumina 0.5 g boric add 5 mL H$_2$O | 2.87 mm | 1.85 V | 4.44E8 | 0.9 V |
| 8 g alumina 0.8 g boric. acid 8 mL H$_2$O | 4.13 mm | 2.18 V | 4.43E8 | 0.8 V |

FIG. 5 illustrates capacitive cycling in accordance with one embodiment. SDM capacitors 10 go through regular cycles, as shown. Note that the discharge time during the steady capacitive part of the cycles (<0.8 V) is more than 2000 seconds. There is some difference between charge and discharge cycles in terms of apparent capacitance.

It is important to recognize limitations of SDM capacitors 10 created using the aluminum/boric acid paste SDM, i.e., an A-SDM. First, SDM capacitors 10 can be charged to an ultimate voltage less than 2 Volts, no matter the applied charging voltage. Second, SDM capacitors 10 have a constant, high dielectric value, below about 0.8 V. There is some capacitance between the ultimate charging value (ca. 1.5 volts) and the onset of super dielectric behavior (0.8 V) but the capacitance is relatively low.

Figure 6:
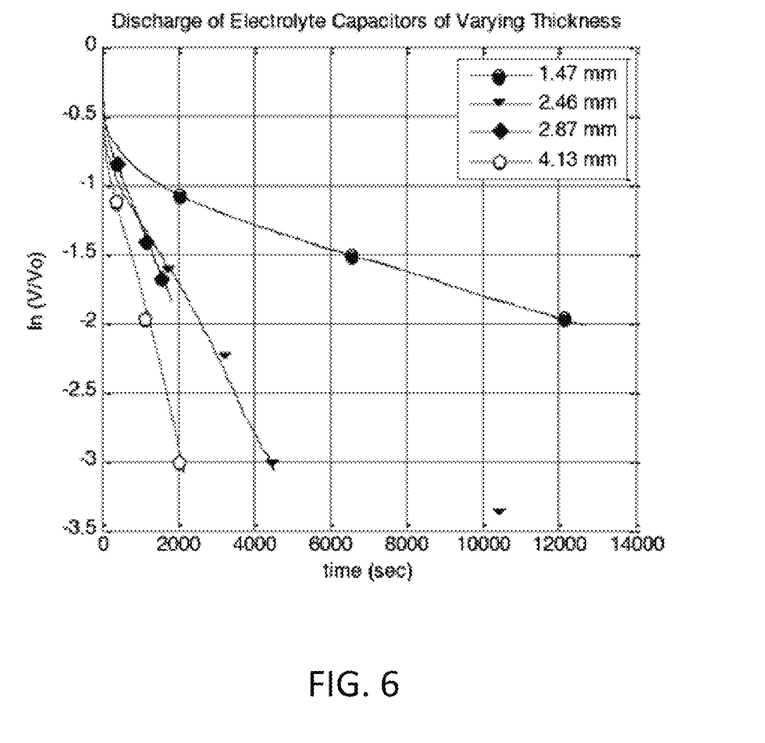
FIG. 6 is a graph showing discharge of electrolyte capacitors of varying thicknesses.

FIG. 6 illustrates dielectric constant in accordance with an A-SDM embodiment. From Equation 2 it is clear that the linear part of a plot of ln(V/V0) vs. time will yield the time constant, and using Equation 1 and measured surface area and depth, the dielectric constant can be obtained.

Only one parameter was modified in this initial study, which is the thickness of the A-SDM dielectric layer. As shown in Table I, SDM capacitors 10 with four different thicknesses of the dielectric material were created and tested. The plotted data, shown in FIG. 6, shows that the capacitance increases with decreasing thickness. From a fit of the line the capacitance can be projected to thickness, and that value employed to predict energy density as a function of thickness.

TABLE 2

| Composition | Dielectric Thickness (d) | Initial Discharge Voltage ($V_0$) | Dielectric Constant ($E_R$) | Operating Voltage |
|---|---|---|---|---|
| 3 g alumina 0.3 g boric acid 3 mL H$_2$O | 1.47 mm | 2.20 V | 1.81E9 | 0.7 V |
| 4 g alumina 0.4 g boric acid 4 mL H$_2$O | 2.46 mm | 2.16 V | 5.78E8 | 0.8 V |
| 5 g alumina 0.5 g boric add 5 mL H$_2$O | 2.87 mm | 1.85 V | 4.44E8 | 0.9 V |
| 8 g alumina 0.8 g boric. acid 8 mL H$_2$O | 4.13 mm | 2.18 V | 4.43E8 | 0.8 V |

As can be seen from Table 2, the thinner the dielectric layer, the higher the capacitance. There is a variation in measured dielectric constant, but this probably does not reflect something fundamental, but rather the irregularity of handmade construction.

In addition to the above quantitative data, several qualitative observations were made regarding performance. First, the paste used to form dielectric layer 2 readily dries and transforms from a paste to an apparently totally dry, chalky solid. That is, it can be crushed using minimal force to form a fine powder. Simply leaving SDM capacitor 10 exposed to the laboratory environment for greater than 10 days leaves dielectric layer 2 in this form. In this form the capacitance is so low that charging and discharging take only one or two seconds. Second, it is clear that the addition of water to the dry dielectric from a dropper (added from above after lifting off the top Grafoil sheet), in an amount nearly equal in amount to that used initially, restores the paste consistency and the capacitance to within a factor of two of the value measured before drying. Third, if all parameters are the same, however no boric acid is present and only distilled deionized water is added to the alumina, then the capacitance is very low.

Figure 7:
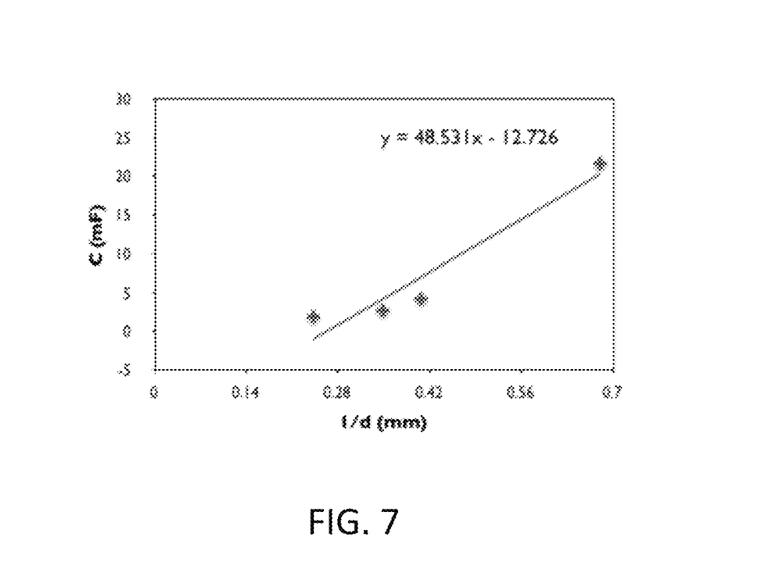
FIG. 7 is graph of C(mF) vs. l/d (mm).

FIG. 7 illustrates the impact of thickness in accordance with one embodiment. Ideally, as illustrated in Equation 2, there is an inverse relationship between capacitance and thickness. As shown, a linear fit of the data is reasonably consistent with this theory.

Example 2

In another embodiment of the present invention another SDM is formed in the following manner. Reference is still made to FIGS. 1 and 2 regarding the general structure and method for forming dielectric layer 2 and SDM capacitor 10. Likewise the characteristics and general principals expressed by these features also apply to the example provided below.

In this second embodiment, the materials employed to create SDM dielectric layer 2 were an alumina/NaCl solution SDM. The SDM was created using high surface area aluminum oxide powder (Alfa Aesar, γ-phase, 99.97%, 3 micron APS Powder, S.A. 80-120 m2/g, CAS 1344-28-1), NaCl powder (Sigma-Aldrich 10 mesh anhydrous beads, 99.999%), and distilled deionized water, i.e, constituents. The above constituents were mixed by hand in three ratios. In all cases the alumina:$H_2O$ ratio was the same, 1 g alumina:1.1 mL $H_2O$. Three different NaCl ratios were employed to create three different SDM: low salt SDM: 0.01 gm salt/1 gm alumina; medium salt SDM: 0.1 gm salt/1 gm alumina, and high salt SDM: 0.3 gm salt/1 gm alumina. Herein the phrase low salt refers to an amount of salt within the range of 0.01 to 0.08 gm salt/1 gm alumina; the phrase medium salt refers to an amount of salt within the range of 0.081 to 0.2/1 gm alumina; and the phrase high salt refers to an amount of salt within the range of 0.21 to 1 gm salt/1 gm alumina. In each case the mixing process was as follows. First, water was added to a plastic cup, next salt was added. These mixes were agitated by shaking, not stirring, until all the salt was dissolved in the water. Finally, alumina, in ratio set out above, was gradually added. This created a spreadable paste with little to substantially no 'free' water (incipient wetness). Salt and water are pH neutral.

Similar to Example 1 discussed above, pore structure is a component of the embodiment, the surface area and pore structure were determined from BET nitrogen isotherms collected at 77K and analyzed using a Quantachrome NOVA 4200e. Two samples were independently measured and both yielded results within 5% for all parameters; specifically a surface area of 39+/−1 m2/g, a total pore volume of 0.45 cm3/g and an average pore radius of 245+/−3 Å.

Dielectric layer 2 was formed as a paste that was spread evenly on a first layer 4, which was a 5 cm diameter disc of GTA grade Grafoil (0.76 mm thick, >99.99% carbon). As described elsewhere Grafoil is a commercially available high purity carbon material (available in sheets or rolls) made by compressing naturally occurring graphite flakes with a surface area on the order of 20 $m^2/g$. In the final step a second layer 6 made of Grafoil is placed on top, then mechanically pressed to create a near constant thickness as determined by measurements made at multiple positions using a hand held micrometer. This step completed the construction of SDM capacitor 10. The thickness of dielectric layer 2, required to compute the dielectric constant, used in all computations herein was based on subtracting the thickness of first layer 4 and second layer 6 from the measured total thickness of SDM capacitor 10. The measured thickness of each dielectric layer 2 used in the study of salt content effect are as follows: low salt 0.64+/−0.08 mm, medium salt 0.50+/−0.06 mm, high salt 0.46+/−0.02 mm. The errors are the spread in the eight thickness values measured. These errors probably accurately reflect real, but small, variations in the thickness of dielectric layer 2. These thickness errors dominate the error range computation reflected in the Tables 3 and 4 below.

Once constructed one or more SDM capacitors 10 were placed in an electrically insulating plastic jig with bottom and top cylindrical aluminum electrodes of 5 cm diameter and 5 mm thickness. A 250 g weight was placed on top in all cases. SDM capacitors 10 were then placed in simple circuits, as shown in FIG. 3, for measurements of charge and discharge over nearly the full range of voltage possible. It is important to note that in each case in this study charging and discharging was performed through a 7.5 kOhm resistor for the low and medium salt capacitors, and performed through a 20 kOhm resistor for the high salt capacitor and varying thickness. Some of those at medium salt were also performed through a 20 kOhm resistor and varying thickness.

A simple circuit, rather than a commercial meter, was used to measure capacitance and subsequently dielectric constant—the ability of the capacitor to store electrical energy. Commercial meters intended to measure capacitance employ an algorithm and are only suited for the study of higher frequency behavior. In order to evaluate the capacity for electrical energy storage, maximum operating voltage, and ~0 Hz data is needed. These values are not available from meters.

The primary test platform was a National Instruments ELVIS II electronics prototyping board implemented with LabView 2011 software. An additional multimeter, Agilent U1252A, was regularly used for independent parameter verification. It is further notable that the capacitance of several types of commercial capacitors were measured using the above described instruments and protocol, and in each case the measured value and the listed value were within 30%.

Discharge data was analyzed to determine capacitance using the classic voltage decay equation for a capacitor discharging through a constant load (R): Ln (V/Vo)=−t/RC, equation (1). Hence the slope of a curve of the left side of Eq(1) vs. t is 1/RC. As R is known and fixed, C is readily obtained. The value of C and needed dimensional measurements were used to determine dielectric constant.

The charging and discharging behavior of five SDM capacitors 10 created with sodium chloride salt based SDM was studied. The primary target of this study was to show that the effect of ion identity is not critical in creating super dielectric materials. Another objective was to study the impact of ion concentration on capacitive behavior.

Thus, the salt (NaCl) concentration was varied by a factor of 30 over three SDM capacitors 10 that were constructed using an SDM with a salt in different concentrations, while holding all other parameters virtually constant. However; small differences in some parameters, particularly the thickness of dielectric layer 2 (less than a factor of 1.5), was an inevitable consequence of the imprecise nature of the hand construction. Also, the impact of the thickness of dielectric layer 2, over a factor of six, in which all other parameters were held constant, confirmed that the dielectric constant of super dielectric materials is nearly independent of layer thickness. It must also be noted that this study directly relates to energy storage. If frequency with time constant is correlated, this data is below $10^{-3}$ Hz, as in each case the RC time constants were more than 1000 seconds.

Figure 8:
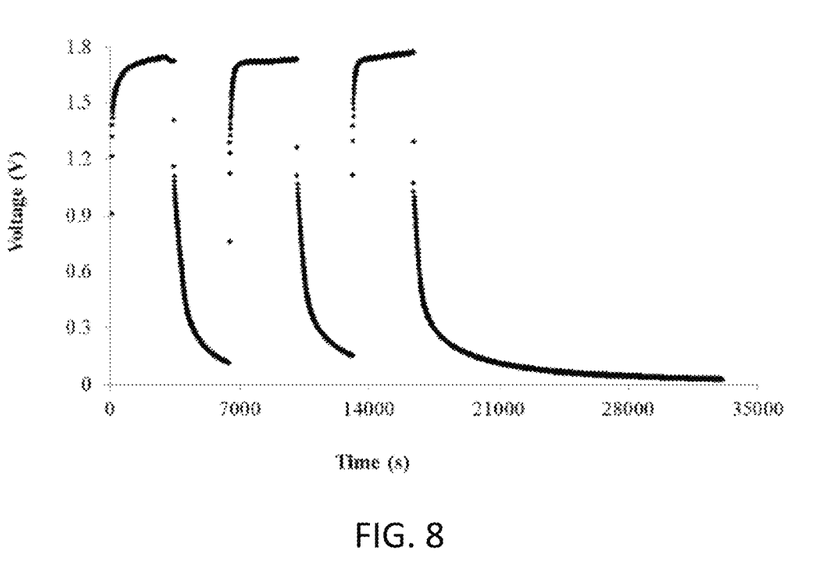
FIG. 8 is graph showing cycles of charge and discharge for SDM capacitors formed using salt based SDM.

Repeated charge/discharge cycles for SDM capacitors 10 formed using a low salt are shown in FIG. 8. Although the applied charging voltage was 4V, a SDM capacitor 10 constructed with a low salt based SDM never reached more than about 1.8 volts. From FIG. 8 it is readily apparent that this SDM capacitor 10, which is exemplary of all three studied, discharged in stages; initially very rapidly, down to approximately 1.1 Volt, then much more slowly. As discussed in detail below, the slow discharge region, which is below ~1 Volt, also can be divided into two different discharge regimes.

Figure 9:
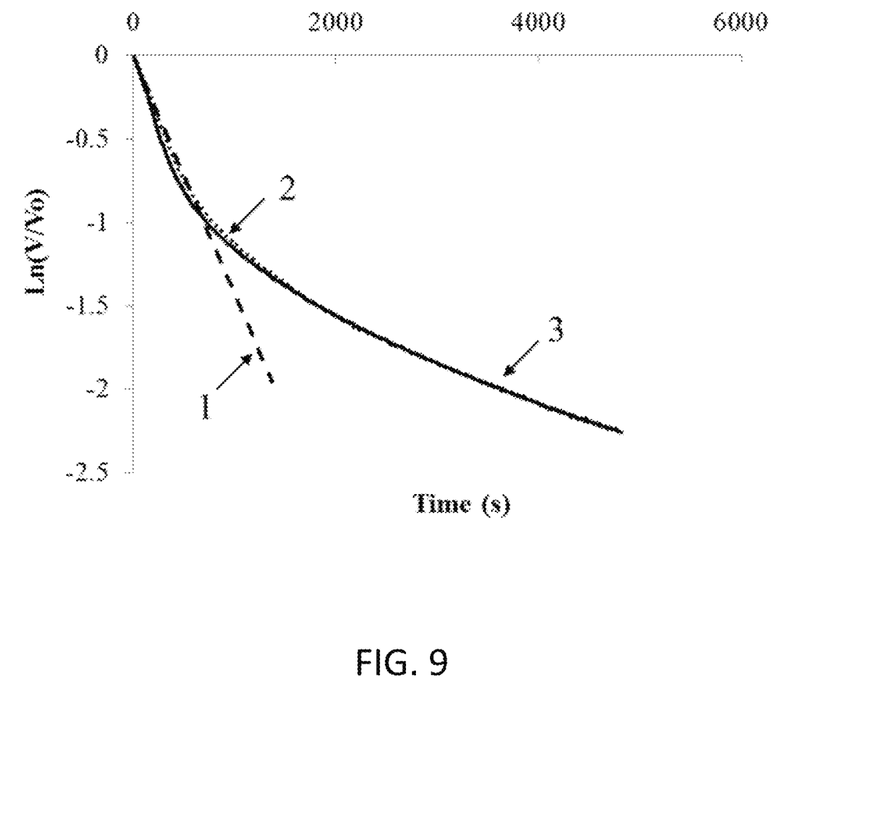
FIG. 9 is a graph showing the discharge cycles of the SDM capacitors shown in FIG. 8.

To explore the discharge behavior in a quantitative fashion, the discharge voltage/time data from the three cycles shown in FIG. 8 were plotted, below 1.1 volts in a semi-log form FIG. 9. For a constant capacitance these plots are linear, and show two linear regions of different slope with an 'elbow' between. In sum, the data can best be modeled as showing three regions of capacitance. The first region is between the highest voltages reached during charging, ~1.8 V, and about 1.1 volts. In this region the capacitance is low, and no effort was made to determine the actual value. The data is not plotted in FIG. 8. The second region is for voltages between ~1.1 Volts and ~350 mV. In this region the capacitance is very high and consistent for all three cycles. The third region is voltages below ~300 mV. In this region the capacitance is 'off scale', relative to commercial ceramic capacitors of the same size. Actual capacitance values are given in Tables 3 and 4 below.

TABLE 3

| SALT LEVEL | CYCLE | VOLTAGE | CAPACITANCE (F) | DIELECTRIC CONSTANT | Max Error % Capacitance and Dielectric |
|---|---|---|---|---|---|
| Low | $1^{st}$ discharge, high volts | 1.1-0.3 | 0.086 | $3.1\ 10^9$ | +/−20% |
| Low | $1^{st}$ discharge, low volts | <0.3 | 0.093 | $3.4\ 10^9$ | +/−20% |
| Low | $2^{nd}$ discharge, high volts | 1.1-0.35 | 0.11 | $3.9\ 10^9$ | +/−20% |
| Low | $2^{nd}$ discharge, low volts | <0.30 | 0.306 | $1.1\ 10^{10}$ | +/−20% |
| Low | $3^{rd}$ discharge, high volts | 1-0.35 | 0.09 | $3.3\ 10^9$ | +/−20% |
| Low | $3^{rd}$ discharge, low volts | <0.30 | 0.45 | $1.6\ 10^{10}$ | +/−20% |
| Medium | $1^{st}$ discharge, High volts | 0.8-0.3 | 0.98 | $2.7\ 10^{10}$ | +/−25% |
| Medium | $1^{st}$ discharge, Low volts | <0.3 | 2.25 | $6.3\ 10^{10}$ | +/−25% |
| Medium | $2^{nd}$ discharge, High volts | 0.0-0.3 | 1.05 | $3.1\ 10^{10}$ | +/−25% |
| Medium | $2^{nd}$ discharge, Low volts | <0.3 | 2.25 | $6.3\ 10^{10}$ | +/−25% |

TABLE 4

| Medium | After Dry and Rewet | 0.9-0.3 | 0.80 | $2.2\ 10^{10}$ | +/−30% |
|---|---|---|---|---|---|
| High | $1^{st}$ discharge, High volts | 1.0-0.3 | 0.17 | $4.4\ 10^9$ | +/−20% |
| High | $1^{st}$ discharge, Low Volts | <0.3 | 1.49 | $3.9\ 10^{10}$ | +/−20% |
| High | $2^{nd}$ discharge, High volts | 1.0-0.3 | 0.24 | $6.2\ 10^9$ | +/−20% |
| High | $2^{nd}$ discharge, Low Volts | <0.3 | 4.7 | $1.2\ 10^{11}$ | +/−20% |
| High | $3^{rd}$ discharge, High Volts | 1.1-0.3 | 0.19 | $4.9\ 10^9$ | +/−30% |
| High | $3^{rd}$ discharge, Low Volts | <0.3 | 2.49 | $6.5\ 10^{10}$ | +/−30% |

Figure 10:
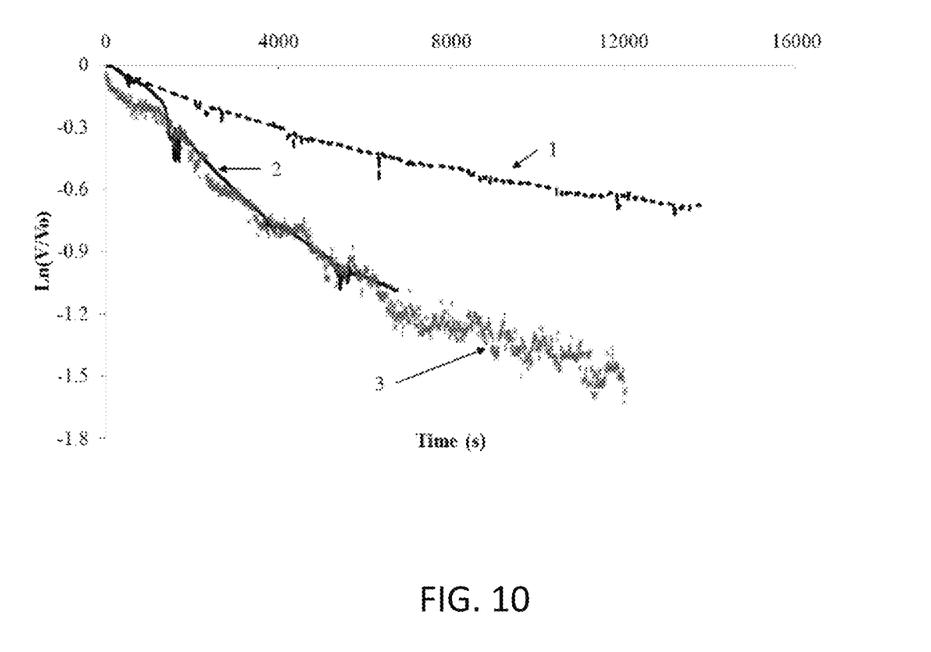
FIG. 10 is a graph showing the discharge of an SDM capacitor using medium salt SDM.

The discharge behavior of SDM capacitors 10 constructed with the medium salt SDM and low salt SDM were qualitatively similar. As shown in FIG. 10, SDM capacitors 10 created with either low salt SDM or medium salt SDM discharged rapidly above a particular voltage, and both showed an 'elbow' in the discharge curve at a low voltage that corresponded to a change in capacitance. However; the quantitative values associated with these features were different. For a SDM capacitor 10 of medium salt the high capacitance/slow discharge point in the medium salt was lower, about 0.9 volts, rather than 1.1 volts. Also, the dielectric constants for dielectric layer 2 of SDM capacitor 10 of medium salt were consistently higher. During the high voltage leg the dielectric constant of the low salt SDM was fairly consistent over discharge curves, equal to $3.5+/-0.4\times 10^9$, whereas the dielectric constant of the medium salt SDM was not less than $2.7\times 10^{10}$, nearly 8 times higher than the low salt SDM. The dielectric constant of the low voltage leg of the medium salt SDM was at least 4 times higher than that observed of the low salt SDM.

To to test the liquid dipole features, a SDM capacitor 10 constructed with the medium salt SDM was allowed to dry, its capacitance measured, and then the paste was re-wetted and its capacitance measured again. An SDM capacitor should have virtually no capacitance after drying, but capacitance should be restored with the addition of water. All observations were consistent with these expectations.

Figure 11:
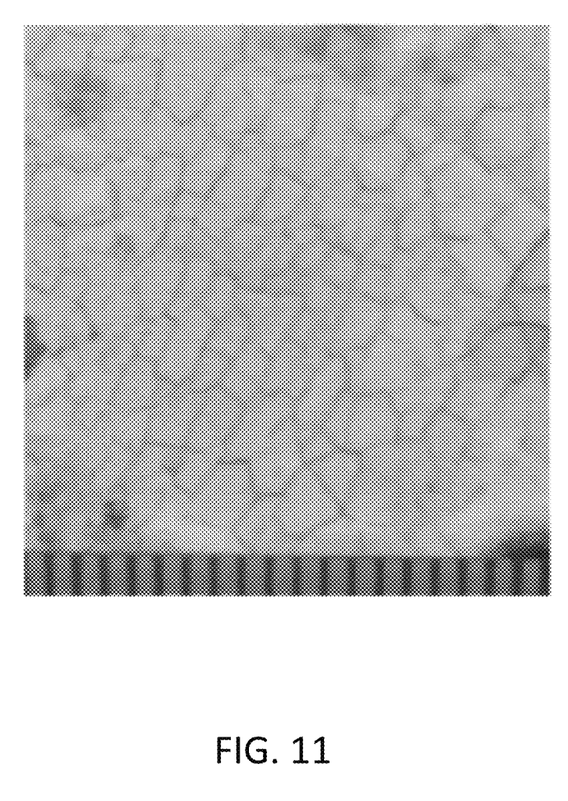
FIG. 11 shows the dried paste of a dielectric layer.

To test the dry state, SDM capacitor 10 constructed with a medium salt SDM was allowed to sit in the room for 15 days in order to dry out. As shown in FIG. 11, at the end of this period of time the paste appeared dry and cracked. In this state SDM capacitor 10 constructed of medium salt SDM had a measured resistance of ~5 MOhms, and no measurable capacitance. That is, after charging for more than an hour, the capacitor discharged to ~1 mV in less than 10 seconds. The measured near zero capacitance is consistent with the absence of water.

A SDM capacitor 10 with a dielectric composed of dried and dead salt based SDM can be restored to initial performance by the addition of water. Indeed, as the salt content is not modified by the drying process, the addition of water to the pores should re-dissolve the salt and permit giant dipoles to form. With the addition of water SDM behavior should be restored. Water was added to the dried dielectric of the medium salt SDM capacitor 10 constructed with medium salt SDM by evenly spreading water, roughly equal to the amount initially present in the dielectric based on an initial measure of the weight of the paste employed in creating dielectric layer 2, on one side of first layer 4 which was removed to permit the inspection. This first layer 4, water side down, was then pressed back onto dielectric layer 2, reforming SDM capacitor 10. The result of this restoration protocol can be seen in FIG. 10 as it nearly restores the initial dielectric constant. There is one difference between the initial behavior of SDM capacitor 10 of medium salt, and that of restored SDM capacitor 10 of medium salt, below about 250 mV there is an elbow, but the data becomes very noisy. Hence, no low voltage capacitance value is provided.

Figure 12:
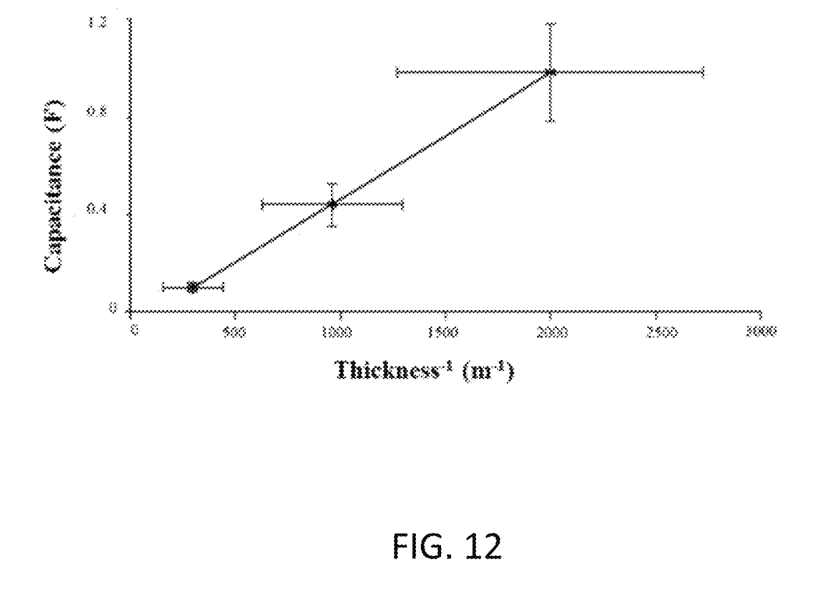
FIG. 12 is a graph of thickness vs. capacitance.

Another study performed with SDM capacitors 10 that used medium salt SDM was of the impact of thickness of dielectric layer 2, as shown in FIG. 12. The behavior matches a linear relationship between inverse thickness and capacitance.

SDM capacitors 10 constructed using medium salt SDM were evaluated for actual energy density. The thinnest dielectric studied was 0.5 mm thick and had a dielectric constant greater than $3*10^{10}$ below 0.9 V leading to a net energy density >0.4 J/cm3. With an SDM capacitor 10 constructed using high salt SDM, the qualitative discharge characteristics was similar to the SDM capacitors constructed with low and medium salt SDMs. First it can be, and was, repeatedly cycled, as per FIG. 8. Second, there was a region of low capacitance from about 1.8 V to 1.0 volts. Third, the slow discharge region could be divided into two sections, a section of high capacitance between about 1 V and 300 mV and a section of extremely high capacitance below 300 mV. The quantitative behavior was unique. At 'high voltages', roughly from 1 V to 300 mV, this capacitor showed performance similar to that observed for the SDM capacitor constructed with low salt SDM.

Figure 13:
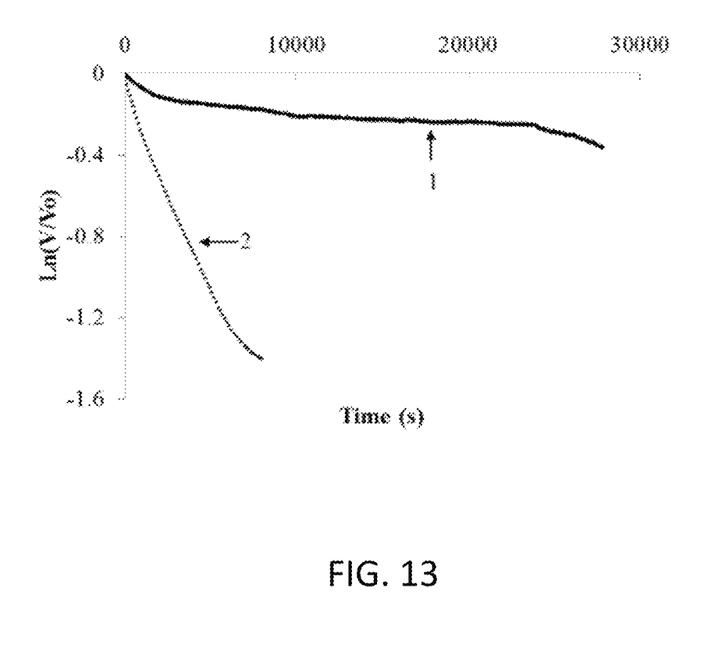
FIG. 13 is a graph of a second discharge cycle of an SDM capacitor using high salt.

Over the voltage range of 1 V to 300 mV, the dielectric constant was no more than 2 times that observed for the SDM capacitor 10 using low salt SDM and clearly far less than that observed for the medium salt sample. In sum, the measured dielectric constant over this voltage region is not a linear function of salt concentration. Below 300 mV there is a very sharp change in the dielectric value as shown in FIG. 13. In FIG. 13, in line 1, the capacitance is extremely high ($>1*10^{11}$) below 300 mV. In line 2, the capacitance between 1.0 V and 300 mV ($>6*10^{9}$) is similar to that observed for low salt SDM capacitors 10, 300 mV. In this voltage range the measured dielectric is similar to that observed for the medium salt SDM capacitors 10, in fact on average 15% higher. For this low voltage range there apparently is a positive correlation between dielectric constant and salt loading, one that may reach a limit asymptotically with the concentration of salt.

The various embodiments in accordance with the invention discussed above illustrate the formation of SDMs, i.e. dielectric materials with dielectric constants greater than $10^5$. In Example 1, the specific dielectric employed was a high surface area alumina impregnated, to the consistency of paste, with an aqueous solution of weak boric acid, which consistently showed dielectric constants greater than $4*10^8$. In Example 2, the specific dielectrics of low, medium and high salt SDMs consistently showed dielectric constants greater than $3*10^9$. Thus, the data illustrates that by adding an ionic solution to highly porous insulating materials creates a high dielectric material. Moreover, assuming a thickness of 5 microns, a typical value for inexpensive commercial ceramic capacitors, and using the average of the dielectric constants measured, i.e. $8*10^8$, yields a remarkable energy density of ~4000 J/cm$^3$, for SDM capacitor 10. Even a computation based on the lowest dielectric constant ($4.4*10^8$) and the lowest 'capacitive voltage' (0.7 V) measured in the present work, leads to an energy density of ~40 J/cm$^3$, still a remarkable value.

The particular dielectric employed is only one of a large family of similar dielectrics materials. A high surface area, highly porous, insulating material, filled with any dissolved acid, or base will have similar dielectric properties. There are many parameters that can be optimized including the identity of the solid, the porosity of the solid, the electrolyte employed, the electrolyte/solid ratio, the salt/acid/base employed to create ions, acid strength/salt concentration.

With embodiments in accordance with the invention of SDM described herein, charge separation, leading to dipole formation, occurs in the nano-scale drops of ion containing liquid in the pores of the alumina. Specifically, in an applied electric field the positive ions will tend to cluster toward the anode of SDM capacitor 10, and negative ions toward the cathode of SDM capacitor 10. This creates a greater charge separation, physically longer, and probably larger, than possible in a solid crystal. Indeed, charge motion in a solid crystal is physically limited to a very small distance, in fact less than the diameter of an atom. In a water drop charge separation can occur over the entire length of a pore. In the case of the alumina employed herein BET analysis indicated the average pore radius was about 250 Å. This indicates that the average dipoles are of length order 500 Å. Pore radius will vary depending on the material used, however generally the radius of the pore is between 100-10,000 Å, although it is postulated that the longer the pores the higher the dielectric constant. As electric dipole moment is proportional to the charge separation distance, and potential energy is proportional to the magnitude of the dipole, energy is proportional to charge separation. Moreover, dipole moment is proportional to the amount of charge separated. The combination of three orders of magnitude increase in dipole length and a significant increase in the magnitude of the charge separation may explain the 4 or 5 orders of magnitude increase in dielectric constant observed relative to that found for barium titinate. Finally, it is notable that pure water in the pores does not display super dielectric properties, as water only has a dielectric constant of approximately 80. Presently, no liquid has a dielectric constant greater than 300.

It is possible that each drop acts as a nearly perfect conductor, such that charges move until the field inside the drop is cancelled. This would make the drops 'metal like', with nearly infinite permittivity. The combination of very large physical dipoles, of nearly infinite permittivity, would create the super dielectric constant values observed in the present work. This can possibly be determined by measurement of capacitance as a function of temperature. At a voltage of around one volt, there is a 'dielectric breakdown' of water. As the water will not only exist in the pores, but will form a matrix that fills all empty space within the powder, once this breakdown occurs, there will be a conduction path from cathode to anode. Hence, as observed, at voltages above the breakdown voltage the effective dielectric constant will drop quickly to zero. Even absent an overall discharge path between electrodes, each individual drop would no longer be able to support a charge separation above the breakdown voltage. Second, in the absence of water there are no liquid drops available to form dipoles. This is consistent with the virtual disappearance of any capacitance once the solid fully dries. Third, once water is added to a desiccated dielectric the drops can reform, the chargeable species will still be present (probably on pore walls), and will re-dissolve, hence, the original dielectric behavior will be observed. This is also consistent with observation.

One difficulty is that water cannot enter pores below a certain size due to surface tension. Technically, this is correct, however; it is well known that water in the form of water vapor will enter pores of any size. In the event one or more 'primary adsorption sites' (PAH) exist in the pore, the water molecule will adsorb and nucleate the formation of a drop of water from other vapor phase water molecules. This leads to Type III isotherm behavior and the complete filling of the pore at a vapor pressure equal about 50% relative humidity. As the wetted alumina should have a local relative humidity of nearly 100%, and there is a high density of primary adsorption sites on a hydrophilic alumina surface, all pores, any size, should be filled. This may be tested through the use of alumina treated to create a hydrophobic surface. Such material should not exhibit SDM behavior.

Finally, the potential value of SDM capacitors 10 may be great for electric energy storage. As noted earlier, with reasonable extrapolation of the collected data, and the projected use of a dielectric with a higher discharge voltage, leads to a remarkable energy density of ~1000 J/cm$^3$. A D-battery ('flashlight battery') has a volume of ~53 cm$^3$. Assuming that about half that volume is taken up by SDM of 5 micron thickness, the rest of the volume evenly divided between electrode and insulating layers, means a 1 D-cell sized SDM capacitor 10 could hold 25,000 J. The best 'd-cell' super capacitors (costly) advertise a capacitance of 3000 V and a voltage of 2.7 V, for a total energy of approximately 11,000 J. In contrast, a typical D battery can deliver just over 80,000 J. This in turn suggests that with optimization, SDM capacitors 10, made of remarkably inexpensive SDM, could surpass supercapacitors, and rival batteries in terms of volumetric energy density.

As described herein a class of materials with dielectric constants greater than $10^5$, herein called super dielectric materials (SDM), can be generated readily from common, inexpensive materials, such as high surface area aluminum oxide powder and boric acid, NaCl powder and distilled deionized water. This is a remarkable increase over the best dielectrics constants previously measured, ca. $1*10^4$. A porous, electrically insulating material (e.g. high surface area powders of silica, titantia), filled with a liquid containing a high concentration of ionic species can potentially be an SDM. It is postulated that water containing relative high concentrations of dissolved ions saturates all, or virtually all, the pores of the alumina, having an average diameter 500 Å. In an applied field the positive ionic species migrate to the anode end, and the negative ions to the cathode end of each drop. This creates giant dipoles with high charge, hence leading to SDM behavior. At about 1 volt, water begins to break down, creating enough ionic species to 'short' the individual water droplets. Potentially capacitors made of stacks of SDM capacitors 10 can surpass super capacitors in volumetric energy density.

It is to be understood that even though numerous characteristics and advantages of the present invention have been set forth in the foregoing description, together with details of the method, composition and function of the invention, the disclosure is illustrative only, and changes may be made in detail, within the principles of the invention to the full extent indicated by the broad general meaning of the terms in which the appended claims are expressed.

Although the invention has been described using relative terms such as "down," "out," "top," "bottom," "over," "above," "under" and the like in the description and in the claims, such terms are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Unless stated otherwise, terms such as "first" and "second" are used to arbitrarily distinguish between the elements such terms describe. Thus, these terms are not necessarily intended to indicate temporal or other prioritization of such elements. Further, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

What is claimed is:

1. A dielectric material having a dielectric constant greater than $10^5$ comprising:
    a porous material comprising pores and having a surface area greater than 1 m$^2$ of surface/gm of material; and
    a liquid containing ions within said pores comprising said porous material.

2. The dielectric material of claim 1, wherein said porous material is a material selected from the group consisting of powders of alumina, silica, titania, magnesia powder, and other metal oxides.

3. The dielectric material of claim 2, wherein said liquid is selected from the group consisting of an acid, a base and a liquid in which a salt is dissolved.

4. The dielectric material of claim 3, wherein said porous material and said liquid form a paste.

5. The dielectric material of claim 1, wherein said porous material has pores having a radius between 1-1000 Å.

6. The dielectric material of claim 1, wherein said porous material is an electrical insulator.

7. The dielectric material of claim 1, wherein said liquid is selected from the group consisting of water and at least one organic solvent, containing an electrolyte selected from the group consisting of an acid, a base, and a neutral salt.

8. The dielectric material of claim 7, wherein said acid is boric acid, said base is potassium hydroxide and said neutral salt is sodium chloride.

9. A capacitor comprising:
a first layer comprising a conductive material;
a dielectric material located on said first layer, wherein said dielectric material has a dielectric constant greater than $10^5$ and comprises;
   a porous material comprising pores and having a surface area greater than 1 m$^2$ of surface/gm of material; and
   a liquid containing ions within said pores comprising said porous material;
and a second layer located on said dielectric material, wherein said second layer is made of a conductive material.

10. The capacitor of claim 9, wherein said porous material is a material selected from the group consisting of powders of alumina, silica, titania, magnesia powder, and other metal oxides.

11. The capacitor of claim 10, wherein said liquid is selected from the group consisting of an acid, a base and a liquid in which a salt is dissolved.

12. The capacitor of claim 11, wherein said porous material and said liquid form a paste.

13. The capacitor of claim 9, wherein said porous material has pores having a radius between 1-10,000 Å.

14. The capacitor of claim 9, wherein said liquid is selected from the group consisting of water and at least one organic solvent, containing an electrolyte selected from the group consisting of an acid, a base, and a neutral salt.

15. The capacitor of claim 14, wherein said acid is boric acid.

16. The capacitor of claim 14, wherein said base is potassium hydroxide.

17. The capacitor of claim 14, wherein said neutral salt is sodium chloride.

18. A method of making the capacitor of claim 9 comprising:
mixing said porous material and said liquid containing ions into a paste, where the paste comprises said porous material and said liquid containing ions within said pores, thereby forming said dielectric material;
contacting said first layer and said dielectric material, thereby locating said dielectric material on said first layer;
contacting said second layer and said dielectric material, thereby locating said dielectric material on said second layer.

19. The capacitor of claim 9 where said ions are present in said liquid at a concentration equal to at least a molarity produced by dissolving 0.01 grams of NaCl in 1.1 ml of H$_2$O.

20. The capacitor of claim 9 where said porous material has pores having a radius between 1-10,000 Å.

* * * * *